United States Patent [19]

Endo

[11] 4,445,385

[45] May 1, 1984

[54] STATIC PRESSURE SENSOR WITH GLASS BONDED STRAIN GAUGE TRANSDUCERS

[75] Inventor: Teruyuki Endo, Covina, Calif.

[73] Assignee: International Telephone & Telegraph Corporation, New York, N.Y.

[21] Appl. No.: 373,405

[22] Filed: Apr. 30, 1982

[51] Int. Cl.³ .............................................. G01L 9/04
[52] U.S. Cl. ......................................... 73/726; 338/4; 73/706
[58] Field of Search .................. 73/726, 727, DIG. 4, 73/706; 338/4, 2, 3, 5

[56] References Cited

U.S. PATENT DOCUMENTS

| | | | |
|---|---|---|---|
| 2,400,467 | 5/1946 | Ruge | 73/726 X |
| 2,472,045 | 5/1949 | Gibbons | 338/4 X |
| 3,149,488 | 9/1964 | Castro | 73/727 X |
| 3,434,090 | 3/1969 | Chelner | 338/2 X |
| 3,505,634 | 4/1970 | Von Vick | 338/4 |
| 3,581,572 | 6/1971 | Frick | 73/706 |
| 3,739,644 | 6/1973 | Underwood et al. | 338/4 X |
| 3,918,019 | 11/1975 | Nunn | 73/726 X |
| 3,922,705 | 11/1975 | Kerman | 73/726 X |

Primary Examiner—Gerald Goldberg
Assistant Examiner—Tom Noland
Attorney, Agent, or Firm—T. E. Kristofferson; A. D. Stolzy

[57] ABSTRACT

The disclosure is drawn to a statc pressure unit having a circular dividing fitting with two silicon strain gauges glass bonded thereto. The strain gauges are located to place one strain gauge in tension and one in compression when the fitting is pressurized. One of two embodiments may be employed. In either case, one strain gauge is positioned in tension symmetrically across the center of the fitting. The other strain gauge is placed so that it is in compression.

1 Claim, 7 Drawing Figures

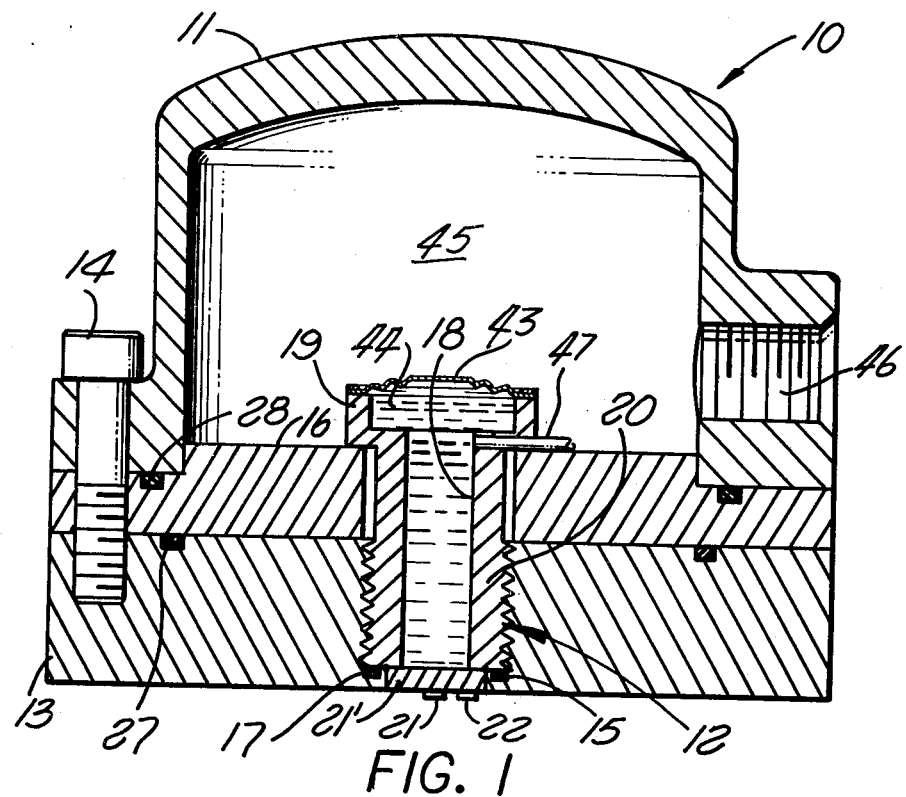
FIG. 1
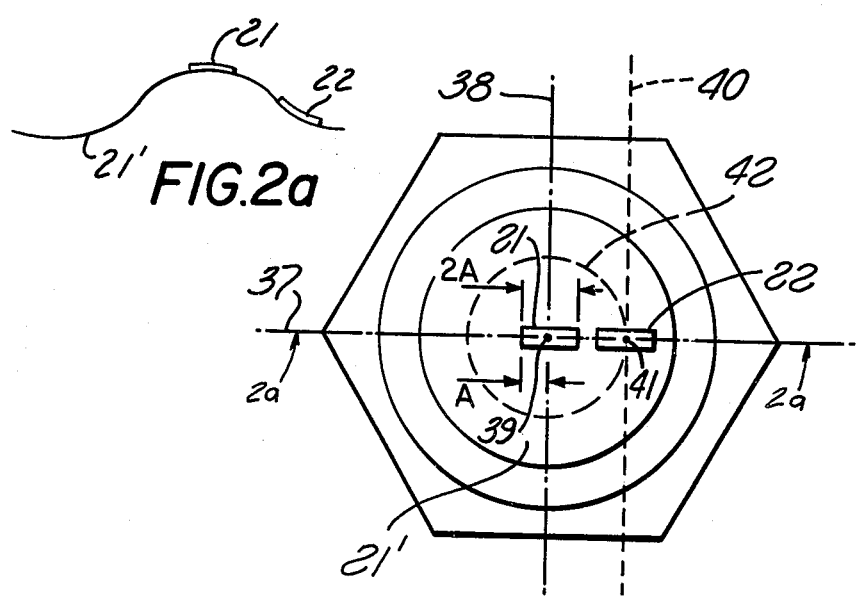
FIG. 2a
FIG. 2

STATIC PRESSURE SENSOR WITH GLASS BONDED STRAIN GAUGE TRANSDUCERS

BACKGROUND OF THE INVENTION

This invention relates to fluid pressure sensitive instruments, and more particularly to a pressure indicator or the like.

PRIOR ART STATEMENT

See copending application T. Endo et. al. Ser. No. 374,988 entitled Transmitter which discloses a disc rather than a fitting.

It has been known prior to the present invention that a cantilever beam may have two matched silicon strain gauges bonded thereto with glass in a differential pressure unit (DPU) between two bellows for differential pressure measurement. Such a construction is disclosed in R. E. Talmo et. al. Ser. No. 109,224, now U.S. Pat. No. 3,722,264 issued Mar. 27, 1973. See also W. J. Cooper 2, U.S. Pat. No. 4,247,078 issued Jan. 27, 1981.

Glass bonding processes are conventional. For example, see R. E. Talmo Ser. No. 150,502, now U.S. Pat. No. 3,713,068 issued Jan. 23, 1973.

Circuits for producing an output signal from strain gauges which is a linear function of differential pressure have also been known in the prior art. For example, see E. A. Romo Ser. No. 919,966, now U.S. Pat. No. 4,202,218 issued May 13, 1980, and R. E. Talmo et. al. Ser. No. 630,574, now U.S. Pat. No. 3,518,886 issued July 7, 1970.

Many of the above-mentioned references disclose complicated and expensive equipment.

The following U.S. prior art patents are listed here for reference:

| NAME | NUMBER | ISSUE DATE |
|---|---|---|
| Broeze et al. | 2,164,638 | July 4, 1939 |
| Bierman | 2,549,049 | April 17, 1951 |
| Stedman | 3,341,794 | September 12, 1967 |
| Jenkins | 3,473,375 | October 21, 1969 |
| Yerman I | 3,537,319 | November 3, 1970 |
| Vick | 3,641,812 | February 15, 1972 |
| Thorp et al. | 3,662,312 | May 9, 1972 |
| Orth et al. | 3,697,918 | October 10, 1972 |
| Yerman II | 3,743,926 | July 3, 1973 |
| Kurtz et al. I | 3,753,196 | August 14, 1973 |
| Moore | 3,769,827 | November 6, 1973 |
| Hall II et al. | 4,019,388 | April 26, 1977 |
| Shimada et al. | 4,050,313 | September 27, 1977 |
| Couston et al. | 4,102,210 | July 25, 1978 |
| Rosvold | 4,129,042 | December 12, 1978 |
| Edwards et al. | 4,140,023 | February 20, 1979 |
| Tanabe et al. | 4,173,900 | November 13, 1979 |
| Kurtz et al. II | 4,202,217 | May 13, 1980 |

For Broeze et al. see column 1, lines 15–17.
For Bierman see column 1, lines 34–35.
For Stedman see the Abstract, line 4.
For Jenkins see column 3, line 27, and column 4, lines 7–13.
For Yerman I see the Abstract, lines 1 and 2.
For Vick see the Abstract, lines 1 and 2.
For Thorp et al. see the Abstract, lines 1 and 2.
For Orth et al. see the Abstract.
For Yerman II see the Abstract.
For Kurtz et al. I see the Abstract.
For Moore see column 1, lines 8–9, "electrical measurement of pressure changes."
For Hall II et al. see the Abstract.
For Shimada et al. see the Abstract.
For Couston et al. see the Abstract, lines 1, 8 and 9.
For Rosvold see column 1, lines 6–9.
For Edwards et al. see the Abstract.
For Tanabe et al. see the Abstract, lines 1–3.
For Kurtz et al. II see the Abstract, lines 1, 2 and 7.

SUMMARY OF THE INVENTION

In accordance with the transmitter of the present invention, the above-described and other disadvantages of the prior art are overcome by providing a thimble like fitting with an end closure which can take deflection for a static pressure unit or the like with strain gauges bonded thereto.

BRIEF DESCRIPTION OF THE DRAWINGS

In the accompanying drawings which illustrate exemplary embodiments of the present invention:

FIG. 1 is a longitudinal sectional view of a static pressure unit constructed in accordance with the present invention;

FIG. 2 is an enlarged front elevational view of a portion of the unit of FIG. 1;

FIG. 2a is a diagrammatic view of FIG. 2;

DESCRIPTION OF THE PREFERRED EMBODIMENTS

Figure 3:
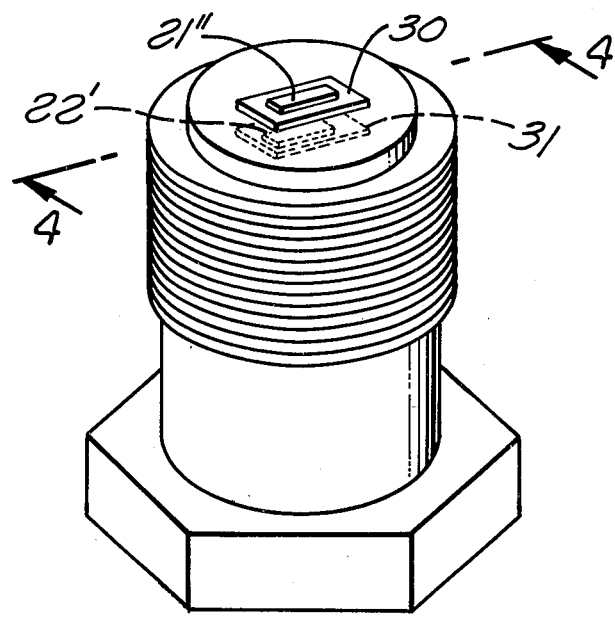
FIG. 3 is a perspective view of a fitting with silicon strain gauges glass bonded to each side thereof in accordance with another embodiment of the invention.

In the drawings, in FIG. 1, a static pressure unit housing 10 is provided having a cup shaped portion 11 fastened to partition means 13 and 16 by three equally spaced bolts 14.

A fitting 12 is threaded into plate 13. An O-ring 15 in a groove 17 seals fitting 12 to plate 13.

Fitting 12 is hollow at 18 and has a hex head at 19. Fitting 12 has a shank 20 heliarc welded to a cover 21'. Cover 21' has two silicon strain gauges 21 and 22 glass bonded to one side thereof. Strain gauges 21 and 22 have electrical leads, not shown.

O-ring seals are provided at 27 and 28.

Figure 5:
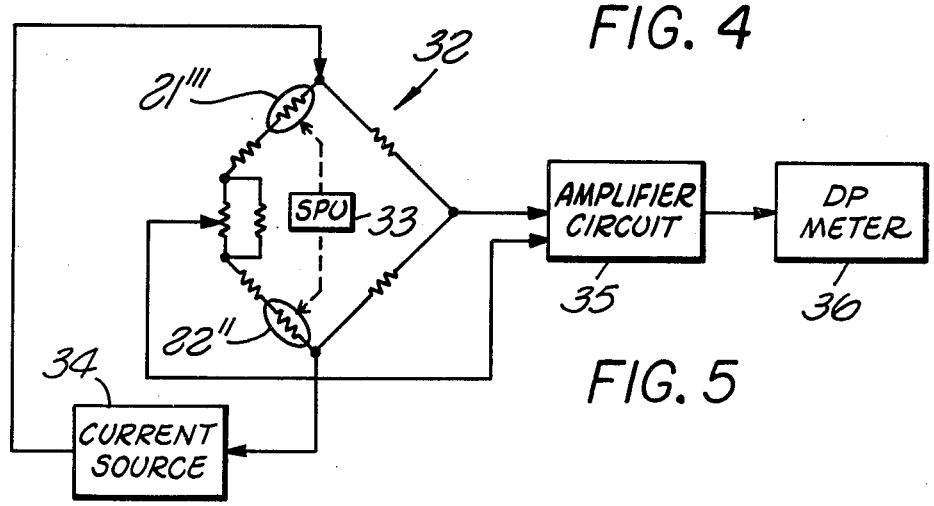
FIG. 5 is a schematic diagram of a static pressure transmitter.

With the circuit of FIG. 5 connected from strain gauges 21 and 22, and with fluids filling cupped shaped portion 11, the difference between the external and internal pressures (on the opposite sides of cover 21') may be detected.

Cover 21' and strain gauges 21 and 22 are again shown in FIG. 2. Although strain gauges 21 and 22 are glass bonded to cover 21', such glass is not shown in FIGS. 1 or 2, but similar ones are shown at 30 and 31 in FIGS. 3 and 4.

Figure 4A:
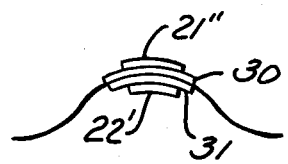
FIG. 4a is a diagrammatic view of FIG. 4.
Figure 4:
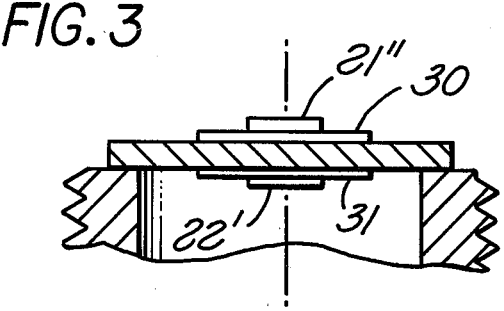
FIG. 4 is a broken away transverse sectional view of the fitting partly in elevation, taken on the line 4—4 shown in FIG. 3.

Note that in FIG. 4 strain gauges 21" and 22' are in tension and compression, respectively, when the internal pressure is higher than the external pressure.

Strain gauges 21 and 22 and strain gauges 21" and 22' may be the same as or similar to strain gauges 21''' and 22'' shown in Wheatstone bridge 32 in FIG. 5. Other than a conventional static pressure unit (SPU) 33 and strain gauges 21''' and 22'', bridge 32 may be entirely conventional. For example, bridge 32 may be of the type disclosed in the said E. A. Romo patent. Further, the entire transmitter, i.e., all the structure shown in FIG. 5, other than SPU 33 and strain gauges 21''' and 22'', may be identical to that shown in the said E. A. Romo patent.

It is new to employ an SPU with a fitting having strain gauges bonded thereto.

In FIG. 5, a current source 34 supplies current to bridge 32. The output of bridge 32 is impressed upon amplifier circuit 35 that has a voltmeter 36 (DP METER) at its output perhaps calibrated in static pressure.

Note in FIGS. 1 and 2 that strain gauge 21 is in tension while strain gauge 22 is in compression.

Before the glass bonding, metal cover 21' and equivalents thereof are preferably punched, lapped and polished, and the same are heliarc welded to shank 12.

In FIG. 2, centerline 37 intersects centerline 38 at dot 39. Strain gauge 21 is symmetrical about perpendicular lines 37 and 38. Strain gauge 22 is symmetrical about perpendicular lines 37 and 40 through dot 41. Line 40 is tangent to circle 42 (bore 18). Dot 41 is in the middle of strain gauge 22.

In FIG. 1, a flexible diaphragm 43 retains a conventional liquid 44 (for example, a silicon oil) and senses a fluid in a chamber 45. Fluid is admitted to the chamber 45 via threaded port 46. Silicon oil 44 may be injected into place via a copper tube 47 which may be thereafter pinched off or otherwise sealed.

In FIG. 2a, note will be taken that the central part of metal cover 21' is convex upwardly, whereas that portion thereof in which strain gauge 22 nests is approximately concave downwardly.

Similarly, in FIG. 4a, the cover is convex upwardly, but, by inspection, 21'' and 30 are in tension and 22' and 31 are in compression.

What is claimed is:

1. A transmitter comprising: a fluid housing having a wall; a fitting including an externally threaded hollow shank forming a cylindrical passageway about a central axis therein, said shank having a circular disc centered perpendicularly about said passageway axis, said disc being welded to said shank covering one end of said passageway, said fitting being threaded into and sealed in a fixed position in said wall, a central portion of said disc expanding outwardly of said housing when a fluid is held therein at a pressure inside said passageway higher than that on the outside of said disc; first and second strain gauges glass bonded to the same outside surface of said disc in positions to increase and to decrease in resistance as said disc expands outwardly, said first strain gauge being transversely and longitudinally centered symmetrically on a diametral line through the center of said central portion, said second strain gauge being transversely centered on the same said diametral line but longitudinally spaced from said first strain gauge; and means connected from said first and second strain gauges to produce an electrical output signal which is a first function of the resistances of said first and second strain gauges, said first function being a second function of the pressure within said passageway, each of said first and second strain gauges being approximately the same size, rectangular in top and bottom plan, substantially uniform in thickness, and glass bonded to the external circular surface of said disc, the center of said first strain gauge lying on the axis of said passageway, the longitudinal axis of said first strain gauge being the same as that of said second strain gauge, a line normal to said circular disc surface through the center of said second strain gauge being tangent to the cylindrical surface of said passageway.

* * * * *